Patented May 22, 1928.

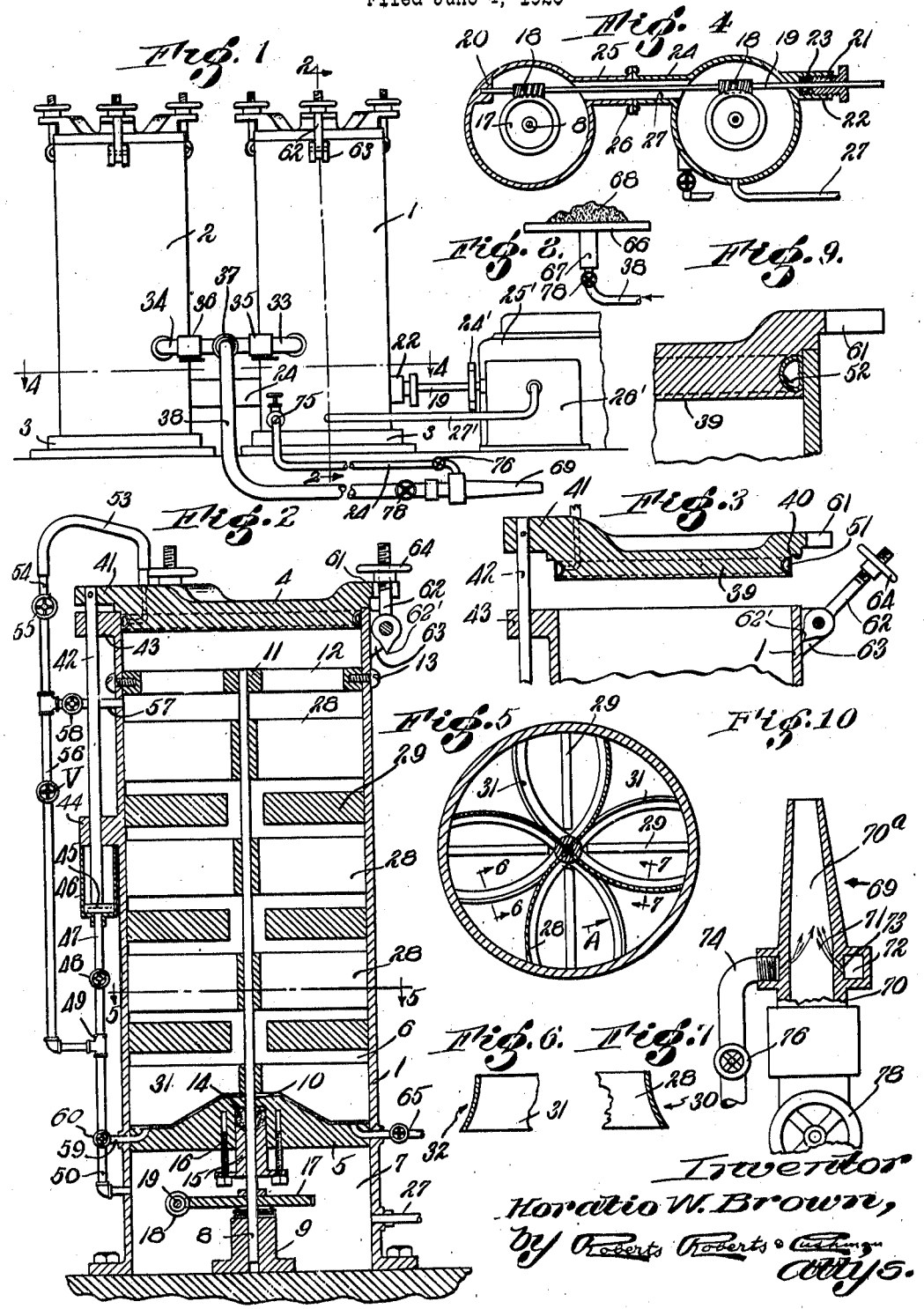

1,670,677

UNITED STATES PATENT OFFICE.

HORATIO W. BROWN, OF CONCORD, MASSACHUSETTS, ASSIGNOR TO BEMIS INDUSTRIES, INC., OF BOSTON, MASSACHUSETTS, A CORPORATION OF DELAWARE.

PROCESS OF AND APPARATUS FOR MIXING AND APPLYING MORTAR.

Application filed June 4, 1925. Serial No. 34,870.

This invention pertains to a process of and apparatus for mixing and applying mortar or plastic materials having similar characteristics and more particularly to a process of and apparatus for thoroughly mixing dry materials, for example, cement, lime, gypsum and so forth with sand or other inert material, and water or other suitable fluid to form a plastic aggregate, the mixture being delivered at a controllable velocity in a solid stream without interruption to the point of use where it is applied by hand in accordance with usual methods and by means of suitable tools; preferably by means of an applicator nozzle from which it is ejected by means of compressed air.

While I am aware that many attempts have been made heretofore to mix grout and cement concrete by mechanical means, and automatically and continuously to deliver such mixtures to the point of use, I do not know of any prior process or apparatus which has been proven successful for the purpose of mixing and delivering relatively dry aggregates such for example as lime mortar of the consistency desirable for interior plastering, since the proper application of such mortar demands a low and readily controllable rate of delivery of the material at the point of use.

True fluids of homogeneous character, even though quite viscous, as for example, paint or thin cement grout containing little inert material may with comparative ease be forced at uniform velocity into and through pipes of relatively small diameter by the application of pressure to the surface of the fluid in the supply vessel, but in dealing with granular plastic aggregates, even though such aggregates contain a large percentage of liquid and are superficially fluid-like in appearance, great difficulty is experienced in causing them freely to enter and to flow uniformly through tubes or conduits of a practical diameter.

This difficulty in dealing with plastic aggregates appears to arise from the fact that such aggregates usually contain a large percentage of granular material whose grains tend, when subjected to continuous fluid pressure, to interlock and form a bridge or arch between the sides of the container. This action is particularly noticeable at an orifice leading from a large vessel to a conduit of relatively small diameter or wherever any irregularity occurs in the interior surface of such conduit, as for example, at bends or corners, or where the container or conduit varies in diameter,—thus obstructing and often completely stopping the flow.

Whether or not this arching or bridging of the grains is wholly responsible for the obstruction of the free flow of such an aggregate into and through a conduit, it has been observed that in attempting to force such materials into and through long tubes of relatively small diameter by means of air pressure alone an extremely high pressure is required and that even at such pressures the material fails to flow continuously and uniformly, but instead is discharged in intermittent spurts or jets and that the conduit very frequently becomes choked.

For the delivery of cement concrete it has been proposed to convey the mixture through a tubular conduit by means of an air current of high velocity upon which the mixture may be said to "float" but this necessitates a very high rate of delivery, usually of the order of forty feet per second, resulting in a jet-like spattering discharge not at all suitable for a plastering operation.

Moreover, if such an air borne stream of material be throttled or stopped, the solids immediately settle to such an extent that it is frequenly found impossible to re-establish the flow when desired and if under such circumstances the pressure of the air be increased the air will force its way through the solids in the conduit without picking them up so that it is necessary to disconnect the conduit and clear it mechanically before the operation can be resumed.

As above pointed out it is essential in dealing with mortar or plaster such as is used for plastering interior walls that the rate of delivery be relatively low as compared with such air delivery of concrete as just referred to, since the application of plaster to a wall surface is an operation requiring care and skill, whereas it is permissible in dealing with concrete for filling forms or moulds to deliver it at as high a velocity as can be obtained, and while in the latter case there is no particular necessity for stopping or starting the flow quickly it is highly desirable in dealing with plaster that the plasterer be able to control the rate of delivery at the discharge end of the conduit to correspond with his varying requirements or to stop delivery for indeterminate periods with the assurance of immediate resumption of delivery when wanted.

Although continuous and uniform pressure when employed for propelling the plastic material acts in the uncertain manner described, and a high velocity air current is not permissible as a vehicle for plaster, I have discovered that a combination of fluid (for example air) pressure of moderate degree combined with mechanical pressure, particularly if the latter be of a pulsating or intermittent character, produces a substantially uninterrupted and uniform delivery of material through the conduit, so that the material flows in a solid homogeneous and easily controlled stream and may, if desired, be applied directly by means of a nozzle. Apparently such interrupted relief or partial relief of pressure prevents the segregation of the granular particles and the formation of arching bridges within the container but whatever the cause of the observed action, I find that such intermittently applied pressure effectually overcomes the difficulties heretofore experienced.

Preferably I employ a combination of fluid pressure of uniform degree, for example that of compressed air at a pressure which may be substantially lower than that previously thought necessary for the purpose, combined with mechanical pressure, preferably pulsating. However, I contemplate the employment of pulsating pressure alone, whether applied as fluid pressure or mechanical pressure, or in some cases non-pulsating mechanical alone as being within the scope of my invention and as capable of producing desirable results.

Preferably I continue the mixing operation up to the time that the mixture enters the delivery conduit and for the practice of my improved process I prefer to provide a plurality of vessels each furnished with agitating or stirring means and each having an air tight cover so that compressed air may be admitted to the vessel either before or after the initial mixing and stirring. Each vessel is also provided with means, for example, one or more rotating paddles or extruding blades for mechanically and intermittently pushing portions of the mixture into the mouth or entrance of the delivery conduit. Preferably the stirring and forcing devices for the several vessels are actuated simultaneously by power from a common drive shaft and an air compressor furnishes air at suitable uniform pressure to each of the several vessels. By employing a plurality of vessels, one may be delivering while the other or others are open to receive a fresh charge.

The covers of the several vessels are furnished with inflatable packings in order to obtain a tight joint between them and the wall of the vessel, and each cover is preferably connected to a pneumatic piston by means of which it may be lifted from its respective vessel. The several vessels all deliver to the same conduit and check valves are provided at the inlets of the several conduits to prevent retrograde flow of the mixture when the vessels are open.

The conduit may deliver the mixture to a hawk or other suitable support or receptacle for trowel application or to the trowel directly, or to a suitable nozzle, of which a preferred form is hereinafter described, for direct application to the wall or ceiling.

In the accompanying drawings a preferred embodiment of the invention is illustrated by way of example, and in the drawings Fig. 1 is a front elevation, partly broken away, illustrating a preferred embodiment of the device;

Fig. 2 is a vertical section to larger scale substantially on the line 2—2 of Fig. 1;

Fig. 3 is a fragmentary section of the upper part of the device as shown in Fig. 2 showing the cover of the mixing vessel lifted;

Fig. 4 is a horizontal section substantially on the line 4—4 of Fig. 1, certain parts being omitted;

Fig. 5 is a horizontal section substantially on the line 5—5 of Fig. 2, certain parts being omitted;

Figs. 6 and 7 are vertical sections substantially on the lines 6—6 and 7—7 respectively of Fig. 5;

Fig. 8 is a side elevation showing the discharge end of the delivery conduit arranged to deliver the material to a hawk;

Fig. 9 is a fragmentary section in a plane similar to that of Fig. 2 to somewhat larger scale showing details of the cover packing arrangement; and Fig. 10 is a longitudinal section illustrating a preferred form of delivery nozzle or applicator.

Referring to the drawings the numerals 1 and 2, respectively, designate vertically disposed substantially cylindrical vessels in which the plastic material is mixed, and from which it is delivered to the point of use. Each of these vessels rests upon a supporting base 3 and is provided with a removable cover 4. While two such vessels are herein disclosed it is contemplated that a greater number may if desired be provided, it being preferred to employ more than one in order that a continuous discharge of properly mixed material may be obtained. Since the several vessels 1, 2, etc., are of substantially identical construction, except for such minor differences as will hereinafter be pointed out in detail, the further description will be confined in general to definition of the structure of the vessel 1.

Referring to Fig. 2, the vessel 1 is furnished with a horizontal partition or septum 5 dividing it into an upper or mixing chamber 6 and a lower or plenum chamber 7. A shaft 8 disposed substantially at the axis of the vessel is mounted to turn in a step bearing 9 in the chamber 7. This shaft passes up through an opening 10 in the septum 5 and is journalled in a bearing 11 near the upper end of the mixing chamber 6, such bearing being supported by a spider 12 secured in position by means of screws 13.

The septum 5 is provided with a chamber concentric with the shaft 8 for the reception of suitable packing material 14 which is retained in properly compressed condition by means of a packing gland 15 adjustably supported by means of bolts 16. This packing material 14 substantially prevents leakage along the shaft 8 from one of the chambers of the vessels to the other.

A worm wheel 17 is mounted upon the shaft 8 within the chamber 7 and this worm wheel meshes with a worm 18 upon a substantially horizontal drive shaft 19. This drive shaft 19 (see Fig. 4) is journaled at one end at 20 in the chamber 7 of the vessel 2 or if more vessels are provided, in the last one of the series, and near its other end it extends through a suitable journal opening in an adjustable packing gland 21 having screw-threaded engagement with a hollow boss 22 projecting from the outer wall of the vessel 1. The packing gland 21 retains suitable packing material 23 in proper position to prevent leakage along the shaft 19. That portion of the shaft 19 which extends from the vessel 1 to the vessel 2, as well as between any succeeding pair of vessels, is housed within tubular bosses 24 and 25 respectively, projecting from the opposed sides of the receptacle, such bosses being flanged at their meeting ends and united by means of bolts 26 to form a continuous airtight pipe or conduit leading from the chamber 7 of one receptacle to the corresponding chamber of the next receptacle. Since the shaft 19 is of substantially less diameter than the internal diameter of the bosses 24 and 25 a continuous air passage 27 is thus provided connecting the chambers 7.

The shaft 19 is driven by a motor or engine 25' (Fig. 1) which, by means of gears 24', also drives an air compressor 26' whose discharge pipe 27' leads to the chamber 7 of the vessel 1. Since the chambers 7 of the several vessels are connected as above described the same pressure is maintained in the plenum chambers 7 of all of the vessels.

Agitators or stirring devices are arranged in spaced relation upon the shaft 8 within the mixing chamber 6. Each agitator preferably comprises a central hub mounted upon the shaft and one or more, preferably four, blades 28 projecting in a generally radial direction from the hub. Preferably the forward faces of these blades are concave, and this concavity may conveniently be obtained by bending the blades, if of sheet metal, as indicated in Fig. 5, where the arrow A indicates the direction of rotation. Preferably also the forward face of each blade is inclined downwardly and forwardly as indicated at 30 in Fig. 7, the shape of the blade thus being such as to tend to lift the plastic material as the blade is rotated.

Intermediate the several agitators 28, which are mounted upon and rotate with the shaft 8, are fixed blades 29 which conveniently may be secured directly to the inner wall of the vessel. Preferably four such blades are arranged in each space between adjacent agitators, and these blades in cooperation with the rotary blades produce an intimate mixture of the materials introduced into the vessel.

Below the lowermost of the agitators an extruding device is arranged, such device preferably comprising a hub secured to the shaft 8 immediately above the septum 5 and one or more pusher blades 31 secured to the hub and extending out substantially to the inner surface of the wall of the vessel. As here shown four such blades are provided, and each of these blades is preferably convex in a forward direction as indicated in Fig. 5. Preferably also each of these pusher or extruder blades is inclined downwardly and rearwardly as indicated at 32 in Fig. 6 for a purpose hereinafter more fully described.

Delivery conduits 33 and 34 respectively lead from the lower parts of the mixing chambers 6 of the receptacles 1 and 2. The mouths or entrance openings of these conduits are preferably disposed in the plane of rotation of the extruding blades 31 so that the ends of these blades sweep or wipe across the openings or mouths of these conduits as the blades revolve with the shaft 8. The conduits 33 and 34 are preferably furnished with check valves 35 and 36, respectively, adapted to prevent retrograde movement of material through the conduits towards the mixing vessels, such valves being of any usual construction. The conduits 33 and 34 merge into a single conduit 37 which is provided with suitable means for attaching a delivery pipe 38. This pipe 38 may be flexible throughout its entire length or may be rigid for a part of its length as may be desirable under the circumstances of any particular case.

The cover 4 of each vessel is preferably furnished with a circular depending portion 39 (Figs. 3 and 9) adapted to fit snugly within the upper end of the vessel 1 and with a shoulder 40 adapted to rest upon the upper edge of the vessel when the cover is closed. The cover is also furnished at one side with an offset projecting ear 41 which is secured to the upper end of a shaft 42 arranged to turn and also to slide axially in bearings in bosses 43 and 44 respectively projecting from the outer surface of the vessel 1. The lower end of the shaft 42 is provided with a piston head 45 which slides in a cylinder 46 having an air admission pipe 47 at its lower end. This air admission pipe is controlled by a valve 48 and is connected at 49 to a pipe 50 leading from the plenum chamber 7.

The depending portion 39 of the cover 4 is furnished with a circumferential groove 51 (Fig. 3) adapted to receive an inflatable air-tight tube 52 (Fig. 9). This tube is connected by means of a flexible pipe 53 to the end of a pipe 54 controlled by a valve 55 and which in turn is connected by a pipe 56 to the pipe 50 so that air from the plenum chamber 7 may, if desired, be admitted to the tube 52.

A pipe 57 controlled by a valve 58 leads from the pipe 56 into the upper part of the mixing chamber 6 and a second pipe 59 controlled by a valve 60 may also extend from the pipe 50 to the lower part of the chamber 6.

The cover 4 is provided with ears 61 slotted to receive corresponding clamping bolts 62 which are pivoted at their lower ends between pairs of ears 63 projecting from the upper part of the vessel, said bolts being screw-threaded at their upper ends for the reception of clamping nuts 64 by means of which the cover may be locked securely in position. The bolts 62 have downwardly directed lugs 62' at their lower ends which are adapted, when the bolt is loosened to allow the cover to be raised, to bear against the side wall of the cylinder 1 as shown in Fig. 3 and prevent the bolts 62 from swinging too far from operative position.

One or more conduits 65 are provided for admitting water or other suitable fluid to the mixing chamber and such conduits may enter the mixing chamber at any desired point as for example through the septum 5.

Referring to Fig. 8 the numeral 66 indicates a plasterer's hawk provided with a handle 67 which in this instance is hollow and receives the delivery end of the pipe 38 so that material delivered through such pipe is discharged upon the upper side of the hawk, forming a pile or heap 68 thereon, from which it may be removed as required by means of a trowel or other suitable instrument, or alternatively, the hawk may be used as a trowel to apply the plaster directly to the wall.

In Figs. 1 and 10 an alternative arrangement is illustrated in which the delivery conduit 38 leads to the nozzle 69. This nozzle comprises a tube 70 (Fig. 10) forming a substantial continuation of the conduit 38 and providing the delivery passage or channel $70^a$. The nozzle also comprises a chamber or chambers 72 from which the jet passages 73 lead through the wall of the tube 70 into the channel $70^a$. These jet passages preferably converge toward the delivery end of the passage $70^a$ and the chamber 72 is connected by means of a suitable pipe or conduit 74 to a cock 75 mounted in the wall of the plenum chamber 7. A controlling valve 76 is mounted upon the pipe or nozzle for determining the amount of air delivered to the chamber 72.

In the operation of the apparatus herein described, it being assumed that one of the vessels, for example vessel 1 is empty, its cover is unlocked by unscrewing the nuts 64 and swinging the bolts 62 downwardly out of engagement with the slotted lugs 61. The valve 55, which is preferably a three-way valve having one passage adapted to be opened to the atmosphere, is then turned to cut off air pressure from the pipe 56 and allow the air in the tube 52 to escape, while the valve 58, also a three-way valve having a passage adapted to be opened to the atmosphere, is turned to cut off the air supply from the pipe 56 and to allow the air in the mixing chamber to escape. The valve 48 also a three-way valve similar to those described above is then turned to admit air from the pipe 50 beneath the piston 45 causing the latter to rise, thus lifting the cover 4 to the position shown in Fig. 3. In this position the cover may readily be swung by hand from over the top of the vessel leaving the upper end of the latter freely open for the reception of the material to be mixed.

In accordance with a preferred mode of procedure, the binding material, preferably of a calcareous nature, for example, lime, gypsum or Portland cement, is first introduced into the mixing chamber together with a proper amount of water, the latter being admitted through the conduit 65. The binding material and the water are combined by the revolving mixing blades to form a mixture of cream-like consistency and then the sand or other inert material is added and thoroughly mixed with the other ingredients. This latter mixture is preferably completed before the cover of the vessel is closed since the wide open and unobstructed top of the vessel permits observation of the contents and visual determination of the degree of completion of the mixture as well as the consistency thereof. However, if desired the material may all be placed in the mixing chamber at once and the cover immediately closed before the mixing operation begins, determining the thoroughness of the mixture by the lapse of time after the mixing operation starts.

To close the vessel the cover is first swung back by hand into registry therewith and the valve 48 is manipulated to relieve the pressure below the piston 45. The relief passage from this valve is preferably small so that the cover will drop slowly. When the cover has been restored to its normal position the clamping bolts 62 are swung up and the nuts 64 are tightened. The valve 55 may now be opened to admit air to the tube 52 thus inflating the latter and producing a substantially air-tight joint between the cover and side wall of the vessel.

It has been assumed in the previous description that the motor 25' is running and driving the mixing blades and also the air compressor 26' which provides suitable pressure in the plenum chamber 7. The control valve 58 is now opened allowing the pressure existing in the plenum chamber to build up in the mixing chamber. This pressure is kept substantially constant by providing the compressor with a suitable unloading valve set to the desired pressure. The plenum chamber of each vessel will be at this pressure at all times except possibly when the valve 58 is first opened. In order to prevent any drop in pressure in the vessel from which material is being delivered a check valve V is placed between the control valve 58 and the plenum chamber so that there can not be any counter flow of air from the mixing chamber which is delivering to the mixing chamber which is just being put into operation.

Assuming the mixture to be of the proper consistency for application at the point of use, the controlling valve 78 provided at the discharge end of the conduit 38 is opened. As soon as this valve is opened and the back pressure in the conduit 38 is relieved, the material begins to flow out through the conduit, being impelled by the fluid pressure of the air acting upon its upper surface assisted by the action of the ejector blades 31. As these blades sweep past the mouth of the conduit 38 each blade wipes or forces a portion of the plastic material into the mouth of the conduit. This periodic mechanical pressure upon the material at the mouth of the conduit is found very effectively to produce the desired continuous flow of the material through the conduit to the delivery end thereof, particularly when combined with the continuous and uniform air pressure.

If the material be delivered to a hawk as shown in Fig. 8 it merely piles up upon the latter and is removed therefrom as desired, the continuous and uniform supply greatly facilitating the work of the plasterer. On the other hand if the material be delivered to a nozzle such as the nozzle 69, it is forcibly discharged from the latter by means of the compressed air jets entering through the openings 73 and thus may be spread directly upon the wall or other surface to be coated. The force of the air jets may be regulated by means of the valve 76 and the supply of material may be regulated by the valve 78 so that any necessary modification of the rate and force of delivery is readily obtainable.

While one of the vessels 1 and 2 is delivering its mixed aggregate to the delivery conduit 38 the other may be opened for receiving a new charge of material and by this alternatve filling and discharge a substantially continuous and uninterrupted supply at the delivery end of the conduit may be obtained. Obviously if the mixing and filling operations in any particular case consume an abnormal amount of time further and similar vessels may be employed so that a uniform delivery of material may in all cases be secured.

In some instances it may be desirable to aerate the plastic mass in order to decrease the weight of the mortar and to assist in the mixing process and for this purpose air may be admitted at the bottom of the chamber through the pipe 59 during the mixing operation.

While, as above described, it is preferred to supplement the action of the extruding blades 31 by means of air pressure acting upon the upper surface of the material in the vessel, such air apparently acting as an elastic cushion in the intervals between the thrusts of the extruder blades, it is contemplated that such fluid pressure may be dispensed with and the desired flow through the conduit obtained solely by the action of the extruding blades or similar devices. As previously pointed out these blades act in an intermittent manner, each forcing out a slug of the material into the conduit and while this may appear paradoxical, this pulsating discharge is apparently far more effective in producing a uniform flow of material in a solid stream through the conduit than can be obtained by continuous and uniform air pressure alone, no matter how high such pressure may be. As the plenum chamber 7 serves as the storage chamber for all the air delivered from the compresser 26', the pressure of air in this chamber will be equal to or higher than the pressure of air in chamber 6. This will make the tendency toward leakage around the stuffing box 15 in the septum 5 always upward, which will prevent gritty material from passing from the mixing chamber to the gears and bearings in the plenum chamber 7.

While extruding blades of the character herein described are preferred and are very effective for the purpose, I contemplate that other mechanical devices acting in a pulsating or intermittent manner may be found effective for the purpose and I regard all such devices for producing flow of plastic material within a tubular conduit as falling within the scope of my invention.

I claim:

1. Apparatus of the class described comprising a vessel for holding a plastic aggregate, a conduit leading from the vessel, and a part which moves periodically toward and away from the entrance to the conduit, said part in approaching such entrance forcing a portion of the aggregate into the latter.

2. Apparatus of the class described comprising a vessel for holding a plastic aggregate, a conduit leading from the vessel, and a rotary blade within the vessel, said blade periodically passing the entrance to the conduit as it rotates and being so shaped that it forces successive portions of the aggregate into the conduit.

3. Apparatus of the class described comprising a vessel for holding a plastic aggregate, a conduit leading from the side of the vessel near the bottom thereof, a rotary shaft within the vessel, a blade secured to the shaft near the bottom of the vessel, the end of said blade sweeping past the entrance to the conduit as it rotates with the shaft, the blade being inclined relatively to a radial plane passing through its axis of rotation whereby to exert a thrust upon the aggregate tending to force it into the entrance to the conduit.

4. Apparatus of the class described comprising a vessel for holding a plastic aggregate, a conduit leading from the side of the vessel near the bottom thereof, a rotary shaft within the vessel, a blade secured to the shaft near the bottom of the vessel, the end of said blade sweeping past the entrance to the conduit as it rotates with the shaft, the blade being curved to provide a convex advancing face and also being so inclined to the plane of rotation as to exert a downward thrust upon the aggregate in the vessel.

5. Apparatus of the class described comprising a vessel for holding a plastic aggregate, a conduit leading from the vessel, means for applying a constant predetermined pressure to the upper surface of the aggregate in the vessel, and mechanical means operative periodically to assist in forcing portions of the aggregate from the vessel into the mouth of the conduit.

6. Apparatus of the class described comprising a vessel for holding a plastic aggregate, said vessel having an air-tight closure, a conduit leading from the vessel, means for supply compressed air to the vessel, and mechanical means within the vessel acting in conjunction with the air pressure to force the aggregate from the vessel into the conduit.

7. Apparatus of the class described comprising a vessel for holding a plastic aggregate, said vessel having an air-tight closure, a conduit leading from the vessel, means for supplying compressed air to the vessel, and a mechanically operated pusher adapted periodically to force portions of the aggregate into the mouth of the conduit.

8. Apparatus of the class described comprising a vessel for holding a plastic aggregate, said vessel having an air-tight closure, a conduit leading from the vessel, means for supplying compressed air to the vessel, a rotary shaft within the vessel, means for rotating the shaft, stirring members secured to the shaft, and an extruding blade also secured to the shaft, said blade being disposed to sweep across the mouth of the conduit at each rotation of the shaft, the blade being shaped to force a portion of the aggregate into the conduit each time it sweeps past the latter.

9. Apparatus of the class described comprising a vessel for holding a plastic aggregate, said vessel having an air-tight closure, a conduit leading from the vessel, means for supplying compressed air to the vessel, a rotary shaft within the vessel, means for rotating the shaft, mixing blades secured to the shaft, the front surfaces of said blades being concave, and an extruding blade also secured to the shaft to rotate substantially in the plane of the mouth of the conduit, said extruding blade having a convex front surface, whereby a small amount of the aggregate is forced into said conduit by mechanical action on each passage of the blade by the mouth of the conduit.

10. Apparatus of the class described comprising a vessel for holding a plastic aggregate, said vessel having an air-tight closure, a tubular conduit leading from the vessel, a rotary shaft within the vessel, means for rotating the shaft, mixing blades spaced longitudinally of the shaft and secured thereto, said blades being so shaped as to tend to move the mixture longitudinally of the shaft in a predetermined direction, fixed blades interposed between the rotary mixing blades, and an extruding blade secured to the shaft to turn substantially in the plane of the mouth of the conduit and so shaped as to tend to move the mixture longitudinally of the shaft in a direction opposite to the movement imparted by the mixing blades.

11. Apparatus of the class described comprising a vertically disposed cylindrical vessel divided by a horizontal septum into a lower plenum chamber and an upper mixing chamber, an air-tight closure for the top of the mixing chamber, a vertical shaft disposed axially of the upper chamber and having its lower end extending through an opening in the septum into the plenum chamber, a conduit leading from the side wall of the upper chamber near the bottom of the latter, mixing and extruding members secured to the shaft, means within the plenum chamber for driving the shaft, means for supplying air under pressure to the plenum chamber, and means for conducting compressed air from the plenum chamber to the mixing chamber.

12. Apparatus of the class described comprising a vertically disposed cylindrical vessel divided by a horizontal septum into a lower plenum chamber and an upper mixing chamber, an air-tight closure for the top of the mixing chamber, a vertical shaft disposed axially of the upper chamber and having its lower end extending through an opening in the septum into the plenum chamber, packing means for preventing substantial leakage along the shaft between the upper and lower chambers, a drive shaft within the plenum chamber, one end of said drive shaft extending out through a packed opening in the wall of said chamber, gearing in the plenum chamber connecting the drive shaft to the lower end of the vertical shaft, means for supplying compressed air to the plenum chamber, means for conducting air from the plenum chamber to the mixing chamber, mixing and extruding blades carried by the vertical shaft in the mixing chamber, and a conduit leading from the latter chamber.

13. Apparatus of the class described comprising a plurality of like vessels each divided by a septum into a mixing chamber and a plenum chamber, a rectilinear tube connecting the plenum chambers of adjacent vessels, a drive shaft within said tube extending from one chamber to the next, a mixing shaft disposed within each vessel, gearing in each plenum chamber connecting the drive shaft to the corresponding mixing shaft, and a conduit leading to one of said plenum chambers for delivering compressed air thereto.

14. Apparatus of the class described comprising a vessel for holding plastic aggregate, a cover for the vessel, said cover having an offset ear at one edge, an axially movable rotary shaft secured to said ear, a piston secured to the shaft, and means for admitting pressure fluid to act on the piston to raise the shaft whereby to free the cover from the vessel and permit it to swing sidewise from off the latter.

15. Apparatus of the class described comprising a vessel for holding plastic aggregate, a cover for the vessel, said cover fitting into the top of the vessel and having a circumferentially extending groove in its edge, an air tight flexible tube seated in said groove, means for admitting compressed air to said tube to inflate the latter and thereby to produce a tight joint between the cover and the wall of the vessel, means for locking the cover in closed position, means for admitting compressed air to the closed receptacle, and pneumatically actuated means for lifting the cover from out of the receptacle when unlocked.

16. Apparatus of the class described comprising a vertically disposed cylindrical vessel divided by a septum into an upper mixing chamber and a lower plenum chamber, mixing and extruding means in the upper chamber, a delivery conduit leading from the latter chamber, means supplying compressed air to the plenum chamber, a cover for the mixing chamber normally fitting into the top of the latter, a pneumatic cylinder having a piston therein, a piston rod connected to the piston, said rod being attached to the cover, an inflatable tube seated in a groove in the edge of the cover, a pipe leading from the plenum chamber, and valved conduits leading from the pipe to the mixing chamber, to the inflatable tube and to the pneumatic cylinder, respectively.

17. Apparatus of the class described comprising a vertically disposed cylindrical vessel divided by a septum into an upper mixing chamber and a lower plenum chamber, the septum having a central aperture, a shaft extending through said aperture from the plenum chamber to the mixing chamber, a packing gland surrounding the shaft to prevent leakage along the shaft from one chamber to the other, an air tight closure for the mixing chamber, a delivery conduit leading from said chamber, mixing and extruding means mounted upon the shaft within the mixing chamber, drive gearing for the shaft in the plenum chamber, a compressor for supplying compressed air to the plenum chamber, and a pipe leading from the plenum chamber to the mixing chamber.

18. Apparatus of the class described comprising an air tight vessel for holding mortar, an elongate conduit leading from the receptacle, means for inducing a slow but uninterrupted flow of mortar from the vessel through the conduit, a delivery nozzle at the end of the conduit, and means for admitting forwardly directed jets of compressed air into the nozzle to assist in projecting the mortar from the delivery end of the latter.

19. Apparatus of the class described comprising an air tight vessel for holding plastic material, an elongate conduit leading from the vessel, means for admitting compressed air to the vessel, rotary extruding means within the vessel for periodically forcing portions of the material from the vessel into the conduit, a delivery nozzle at the end of the conduit, said nozzle having a central passage terminating in a delivery orifice and a plurality of jet passages opening into and converging toward the delivery end of the central passage, and means for supplying said jet passages with compressed air.

20. Apparatus of the class described comprising an air tight vessel for holding plastic material, a conduit leading from the receptacle, means for admitting compressed air to the vessel, rotary extruding blades within the vessel for periodically forcing portions of the material from the vessel, into the conduit, a delivery nozzle at the end of the conduit, said nozzle comprising an inner tube forming a central passage in continuation of the conduit and an air tight chamber surrounding said tube, and means for supplying compressed air to said chamber, said tube having a plurality of circumferentially spaced orifices to admit air from said chamber to the interior of the tube.

21. Apparatus of the class described comprising an air tight vessel for holding plastic material, a conduit leading from the receptacle, means for admitting compressed air to the vessel, rotary extruding blades within the vessel for periodically forcing portions of the material from the vessel into the conduit, a delivery nozzle at the end of the conduit, said nozzle comprising an inner tube forming a central passage in continuation of the conduit and a chamber exterior to the tube, and a pipe for leading compressed air to said chamber, the tube having a series of jet orifices in its side for admitting air to the interior of the tube from said chamber, said orifices being so disposed as to direct jets of compressed air into the tube in converging relation toward the discharge end of the tube.

22. Apparatus of the class described comprising a plurality of vessels each divided by a septum into a plenum chamber and a mixing chamber, means connecting the plenum chamber of the several vessels to equalize the air pressure therein, means for supplying air under pressure to one of said plenum chambers, and means for conducting air from the plenum chamber of each vessel to its mixing chamber.

23. Apparatus of the class described comprising a plurality of vessels each divided by a septum into a mixing and a plenum chamber, a mixing shaft extending through the septum from the plenum chamber of each vessel into its mixing chamber, mixing arms carried by each shaft in the corresponding mixing chamber, a rectilinear tube connecting the plenum chambers of the several vessels, a drive shaft extending axially through said tube, connections in each plenum chamber between the drive shaft and the corresponding mixing chamber, means for supplying compressed air to the plenum chamber of one of said vessels, and means for conducting air from the plenum chamber of each vessel to its mixing chamber.

Signed by me at Boston, Massachusetts, this 21st day of May, 1925.

HORATIO W. BROWN.